May 14, 1940.  A. E. WOODRUFF  2,200,612

GENERATOR

Filed Jan. 11, 1939  2 Sheets-Sheet 1

INVENTOR.
Albert E. Woodruff
BY Davis, Lindsey, Smith & Shonts
ATTORNEYS.

May 14, 1940. A. E. WOODRUFF 2,200,612
GENERATOR
Filed Jan. 11, 1939 2 Sheets-Sheet 2
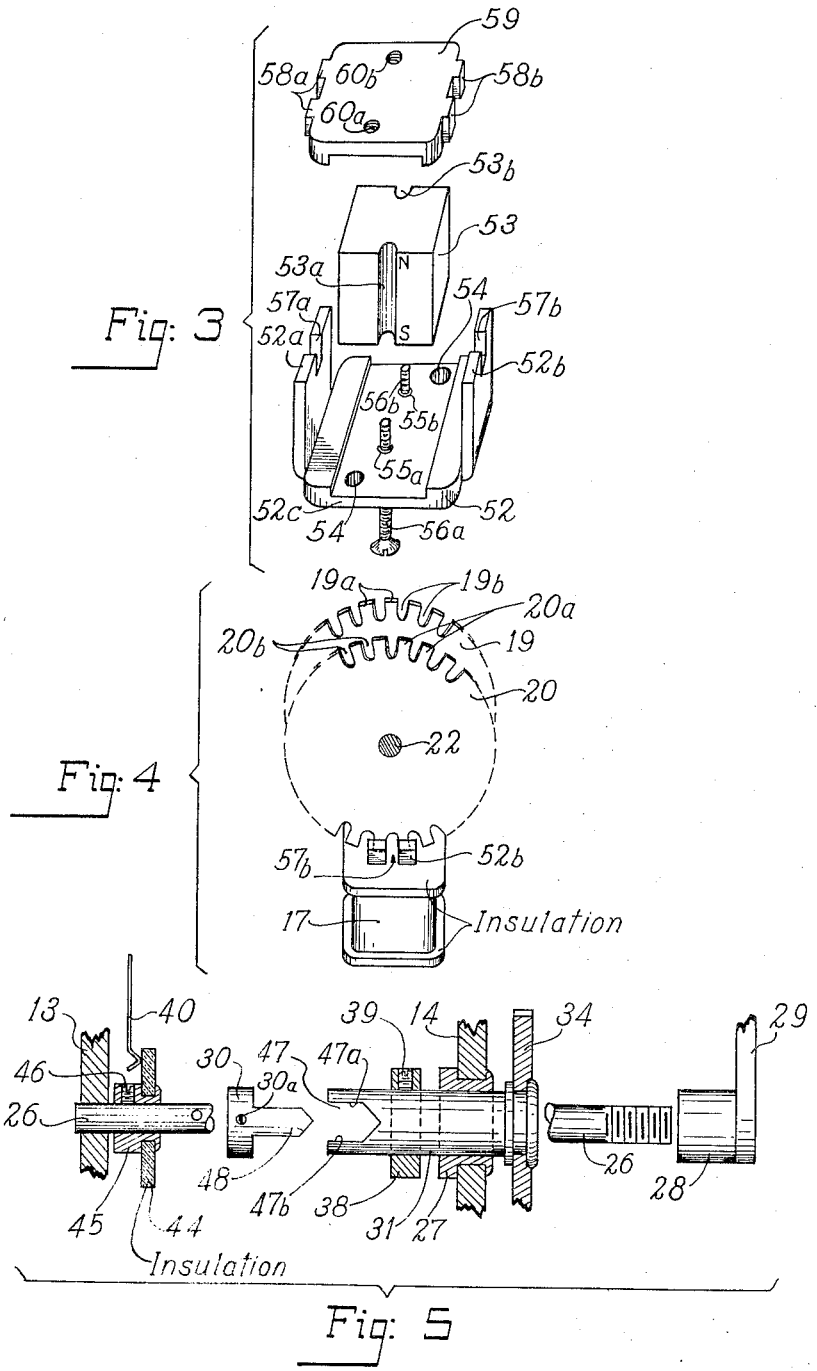
INVENTOR.
Albert E. Woodruff
BY Davis, Lindsey, Smith & Shorts
ATTORNEYS.

Patented May 14, 1940

2,200,612

UNITED STATES PATENT OFFICE 2,200,612

GENERATOR

Albert E. Woodruff, Oak Park, Ill., assignor to Associated Electric Laboratories, Inc., Chicago, Ill., a corporation of Delaware Application January 11, 1939, Serial No. 250,329

8 Claims. (Cl. 171—209)

The present invention relates to alternating current generators and, more particularly, to improvements in hand operated magneto generators of the type extensively used as ringing or signal current generators in telephone systems.

It is an object of the invention to provide an improved generator of the character indicated which is exceedingly small in size and compact in arrangement, is simple in construction and economical to manufacture, and is positive and reliable in operation.

It is a further and more specific object of the invention to provide a generator of the character described wherein the field structure and the supporting structure thereof are arranged in an improved manner for the purpose of minimizing the over-all size of the generator.

In general, the objects as set forth above are realized in accordance with the present invention by providing a generator which comprises a supporting structure including a pair of spaced panels, each provided with an opening therein, together with a magnetic field structure which is mounted upon the supporting structure between the panels and includes windings positioned within the openings formed in the panels. A rotatable shaft carrying a pair of rotor elements is mounted upon the supporting structure, the rotor elements being arranged so that during rotation of the shaft they vary the flux traversing the field structure and linking the windings, thereby to develop undulating voltages in the windings. More particularly, the magnetic field structure is substantially E-shaped and comprises three magnetically linked and spaced-apart legs, the two outer legs respectively carrying the induction windings of the generator and being provided with pole faces. The center or intermediate leg of the field structure comprises a permanent magnet which is provided with pole faces oppositely disposed with respect to the pole faces of the respective outer legs. The rotor elements mentioned above comprise alternate magnetic and nonmagnetic sections which are adapted to be moved between oppositely disposed ones of the pole faces during rotation of the shaft upon which they are carried, thereby to direct the predominant portion of the flux developed by the permanent magnet alternately through one and then the other of the outer legs of the field structure.

Figure 1:
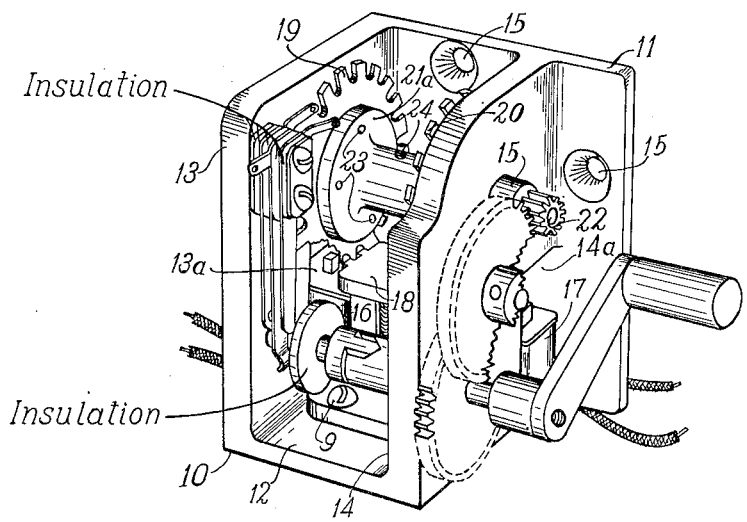
Figure 2:
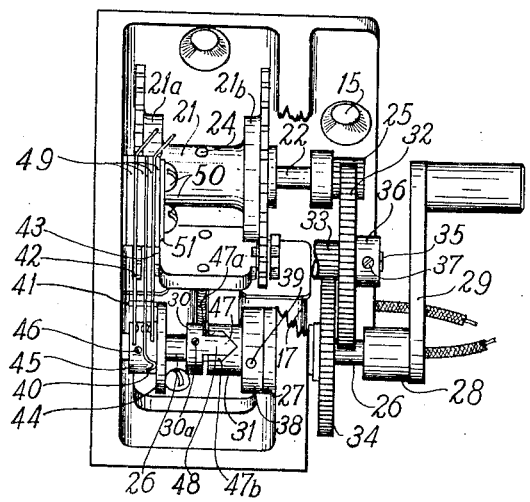

The novel features believed to be characteristic of the invention are set forth with particularity in the appended claims. The invention both as to its organization and method of operation, together with further objects and advantages thereof, will best be understood by reference to the specification taken in connection with the accompanying drawings in which Fig. 1 is an elevated perspective view of a generator having embodied therein the features of the invention as briefly outlined above; Fig. 2 is a front view in elevation of the generator shown in Fig. 1; Fig. 3 is an exploded view illustrating the elements of the field structure embodied in the generator shown in Fig. 1; Fig. 4 is a diagrammatic view in elevation illustrating certain of the elements embodied in the generator shown in Fig. 1; and Fig. 5 is an exploded view illustrating certain elements of the driving mechanism embodied in the generator shown in Fig. 1.

Referring now to the drawings, the generator there illustrated comprises a supporting structure 10 which includes a back or mounting panel 11, a base panel 12, and a pair of spaced-apart parallel extending side panels 13 and 14. This supporting structure is constructed of non-magnetic material, such, for example, as brass or insulating material, and preferably is formed by casting. The back panel 11 of the supporting structure 10 is provided with countersunk drill holes 15 which are adapted to accommodate mounting screws or bolts, not shown. The side panels 13 and 14 are respectively provided with openings 13a and 14a having positioned therein the windings 16 and 17 of a field structure 18 which is secured to the base 12 of the supporting structure by means of screws 9. For the purpose of varying the reluctance of the magnetic circuit provided by the field structure 18 there are provided two rotor elements 19 and 20 which are mounted upon the heads 21a and 21b, respectively, of a mandrel 21 carried by a shaft 22. The rotor element 19 is secured to the mandrel head 21a by means of four rivets 23 disposed around the mandrel head 21a and extending through this head and the rotor element 19. The other rotor element 20 is similarly mounted upon the mandrel head 21b. The shaft 22, upon which the mandrel 21 is rigidly mounted by means of a set screw 24, is journaled in bearing members respectively mounted in the side panels 13 and 14. This shaft carries at its right extremity a small gear 25 through which power is adapted to be transmitted to the shaft 22.

More particularly, the driving mechanism for the rotor elements 19 and 20 is of the improved construction disclosed and claimed in copending application Serial No. 250,330, Elliott H. Otterbacher, filed January 11, 1939. This mechanism includes a shaft 26 rotatably supported within a bearing member 27 which is mounted in any suitable manner in an opening provided in the side panel 14. The shaft 26 has rigidly secured to its right extremity a collar 28 upon which is mounted a crank lever 29. Rotary movement of the shaft 26 occasioned by operation of the crank 29 is transmitted to the shaft 22 through a driving connection including a pair of clutch elements 30 and 31 and a gear train, comprising the gear 25 and three additional gears 32, 33 and 34. More particularly, the clutch element 31 is in the form of a sleeve journaled in the bearing member 27 and having its internal surface arranged to journal the shaft 26. The sleeve 31 has rigidly mounted on the right end thereof the gear 34 which meshes with the gear 33. The two gears 33 and 32 are rigidly secured together and are journaled upon a stub shaft 35 extending from and mounted upon the side panel 14. The two gears 32 and 33 are restrained against longitudinal movement by means of a collar 36 secured to the shaft 35 by a set screw 37. Similarly, the sleeve 31 is restrained against axial movement to the right by means of a collar 38 secured to the sleeve 31 by a set screw 39 and having a smooth surface frictionally engaging the adjacent surface of the bearing member 27.

The shaft 26, upon which the crank 29 is mounted, is axially movable within the sleeve 31 to actuate between two operating positions the movable spring 40 of a spring pile 41 including two additional springs 42 and 43. The actuating element for the movable spring 40 comprises a disk 44 formed of fibre or other insulating material and carried by a collar 45 which is secured to the shaft 26 by means of a set screw 46. As best shown in Fig. 5 of the drawings, in order to move the shaft 26 axially to the left from the position shown in Fig. 1 of the drawings, against the spring bias normally exerted thereon by the movable contact spring 40, the sleeve 31 is provided with two oppositely disposed slots one of which is indicated at 47, each terminating in a V-shaped notch, the tapered sides of which provide camming surfaces. These slots each include extended straight sides formed by milling the sleeve 31, the V-shaped notches being thereafter formed by cutting beyond the bases of the milled sides of the sleeve. Thus, the slot 47 defines two straight side walls 47a and 47b in the sleeve 31. The clutching element or collar 30 is rigidly secured to the shaft 26 by means of a set screw 30a and is provided with a pair of oppositely disposed projections arranged respectively to extend within the slots formed in opposite sides of the sleeve 31 in the manner described above. Thus, the collar 30 has formed integral therewith a projection 48 having straight side walls adapted respectively to engage the straight side walls 47a and 47b of the slot 47, but normally displaced therefrom, and a V-shaped end, the tapered sides of which normally snugly engage the V-shaped end of the slot 47. Thus, the tapered sides of the projection 48 constitute camming surfaces normally engaging the camming surfaces of the slotted portion 47 of the sleeve 31. The other projection extending from the collar 30 is constructed and arranged in a similar manner to extend within the other slot formed in the end of the sleeve 31 and oppositely disposed with respect to the slot 47.

The springs of the spring pile 41 are mounted upon the side panel 13 through the provision of a mounting assembly which comprises four insulating members 49, a pair of mounting screws 50 and a face plate 51. More particularly, the screws 50 extend through registering openings drilled through the face plate 51, the insulating members 49 and the contact springs of the spring pile 41, and are threaded into tapped drill holes formed in the side panel 13. In this manner the contact springs 40, 42 and 43 are insulated from each other and from the supporting structure 10.

The field structure 18 is best illustrated in Fig. 3 as comprising a substantially U-shaped field member 52, having two legs 52a and 52b, upon which the windings 16 and 17 are respectively mounted, and a base portion 52c. The base portion 52c is recessed to receive a permanent magnet 53 and is provided with drill holes 54 for receiving the mounting screws 9, and with additional holes 55a and 55b for receiving the field structure assembly screws 56a and 56b. The upper ends of the legs 52a and 52b are notched at 57a and 57b, respectively, so that each leg is provided with two separated pole faces. The pole face portions of the legs 52a and 52b are arranged to be oppositely disposed with respect to the pole face portions 58a and 58b of a plate or field member 59 which in cooperation with the assembly screws 56a and 56b serves rigidly to mount the permanent magnet 53 upon the base portion 52c of the field member 52. More particularly, the permanent magnet bar 53 is provided with oppositely disposed slots 53a and 53b within which the assembly screws 56a and 56b are respectively disposed when the field structure is assembled, and the field member 59 is provided with tapped drill holes 60a and 60b into which the assembly screws or bolts 56a and 56b, respectively, are threaded. Although the magnet bar 53 may be formed of any desired magnetic material, it is preferably formed of an alloy consisting of 5 to 40 percent nickel, 7 to 20 percent aluminum, 0.5 to 30 percent cobalt, and the remainder iron, such, for example, as the alloy commercially known as "Alnico".

As indicated above, the rotor elements 19 and 20 are arranged to vary the reluctance of the magnetic circuit formed by the field structure 18, thereby to cause induced voltages to be developed in the windings 16 and 17. More particularly, each rotor element is provided around its periphery with alternate magnetic and nonmagnetic sections which are adapted to be moved between the oppositely disposed pole faces of the field structure. Thus, the rotor element 19 is provided with a plurality of teeth or magnetic sections 19a which are alternated with a plurality of cut-out or nonmagnetic portions 19b. The teeth 19a of the rotor element 19 are, when the generator is assembled, adapted to be moved between the pole face portions 58a of the field member 59 and the oppositely disposed pole faces of the leg 52a of the field member 52. In a similar manner, the rotor element 20 is provided with teeth or magnetic sections 20a which are alternated with cut-out portions or nonmagnetic sections 20b. The teeth of the rotor element 20 are adapted to be moved between the pole face portions 58b of the field member 59 and the oppositely disposed pole faces of the leg 52b of the field member 52. The arrangement is such that the teeth or magnetic portions of one of the rotor elements register with the cut-out or nonmagnetic sections of the other rotor element, it being observed that each rotor element is provided with the same number of teeth, and, further, that the number of teeth of the elements partially determines the frequency output of the generator. More particularly, and as best shown in Fig. 4, the rotor element 19 is mounted upon the mandrel head 21a in a manner such that the teeth 19a thereof register with the cut-out or nonmagnetic portion 20b of the rotor element 20, and, correspondingly, the cut-out portions 19b register with the teeth 20a of the rotor element 20. It will also be observed that the rotor elements are mounted upon the mandrel heads in such a manner that, with the shaft 22 occupying a position such that two of the teeth 20a of the rotor element 20 are positioned exactly between the two pole faces 58b and the oppositely disposed pole faces of the leg 52b, one of the teeth 19a of the rotor element 19 registers with the slot 57a of the leg 52a and none of the teeth of this element are positioned opposite the pole faces 58a and the oppositely disposed pole faces of the leg 52a. By virtue of this arrangement and during rotation of the rotor elements the predominant portion of the flux developed by the permanent magnet bar 53 is alternately directed through the legs 52b and 52a of the field member 52. Thus, the flux linking the windings 16 and 17 is varied in response to rotation of the rotor elements 19 and 20 so that undulating voltages are developed in the coils 16 and 17.

In assembling the elements of the generator as described above, the field structure, as shown in Fig. 3, is first assembled in the manner just explained, with the the windings thereof positioned upon the legs 52a and 52b following which the assembled field structure is positioned between the side panels 13 and 14 of the supporting structure 10 and is loosely secured to the base member 12 by means of the screws 9. The mandrel 21 with the rotor elements 19 and 20 mounted thereon is next positioned between the side panels 13 and 14 with the teeth of the rotor elements extending between the pole faces of the field structure 18, it being pointed out that the length of the shaft portion of the mandrel 21 is substantially the same as the distance between the inner surfaces of the side panels 13 and 14 so that no appreciable axial movement of the rotor elements is permitted. Following this operation, the shaft 22 with the gear 25 mounted thereon is inserted through the bearing carried by the side panel 14, through the mandrel 21, and into the bearing carried by the side panel 13. The mandrel 21 is then secured to the shaft 22 by tightening the set screw 24. The next operation is that of positioning the pole faces of the field structure so that the teeth of the rotor elements 19 and 20 are accurately centered between the slots defined by the respective oppositely disposed pole faces. To this end a suitable thickness gauge is inserted between the teeth 19a of the rotor element 19 and the adjacent pole faces 58a of the field member 59, and a second thickness gauge of equal thickness is inserted between the teeth 20a of the rotor element 20 and the pole faces 58b of the field member 59. Thus, by a proper selection of the thickness gauges used the teeth of the rotor elements 19 and 20 may accurately be centered with respect to the associated pole faces of the field structure. Following this centering operation the screws 9 are tightened rigidly to secure the field structure 18 to the base 12 of the supporting structure 10. The next assembly operation is that of mounting the spring pile 41 and its assembly upon the side panel 13, which operation will be obvious in view of the foregoing explanation. The driving mechanism of the generator is assembled by properly positioning the sleeve 31 longitudinally with respect to the bearing 27 with the gear 34 rigidly mounted thereon and the collar 38 loosely positioned thereon and thereafter tightening the set screw 39. Following this assembly operation the shaft 26, with the crank 29 mounted thereon, is inserted through the sleeve 31, the collar 30 and the collar 45 carrying the disk 44. The two collars 30 and 45 are now properly positioned axially along the shaft 26, following which the set screws 30a and 46 are tightened rigidly to secure these elements to the shaft 26. The final assembly operation is that of securing the gears 33 and 32 upon the stub shaft 35 in mesh with the gears 25 and 34, respectively. To this end, the gear combination comprising the two gears 32 and 33 is telescoped over the shaft 35 and the collar 36 is mounted on the shaft 35 in abutting relation with the gear 32. Finally, the set screw 37 is tightened to secure the collar 36 to the shaft 35 and thus prevent axial movement of the gears 32 and 33.

In the operation of the device, and when the crank 29 is turned in a clockwise direction from the position shown in Fig. 1 of the drawings, power is transmitted through the elements 30 and 31 and the gear train comprising the gears 34, 33, 32 and 25 to the shaft 22 upon which the rotor elements 19 and 20 are mounted, thereby to cause rotary movement of these elements. During the preliminary movement of the shaft 26 the inertia of the rotor assembly and the gear train together with the mechanical resistance of the gears and bearings more than offsets the bias exerted upon the end of the shaft 26 by the movable contact spring 40. Accordingly, the engaged camming surfaces defined by the V-shaped notches formed in the sleeve 31 and the tapered ends of the camming projections carried by the collar 30, cooperate to cause the shaft 26 and the disk 44 carried thereby to be deflected to the left. During this longitudinal movement of the shaft 26 the movable contact spring 40 is moved out of engagement with the spring 43 and into engagement with the spring 42. The longitudinal movement of the shaft 26 is limited through engagement of the straight sides of the camming projection 48 with the adjacent straight walls of the slots formed in the sleeve 31. Thus, after a small longitudinal movement of the shaft 26, the upper straight side of the camming projection 48 is moved into engagement with the adjacent slot side 47a to establish a driving connection between the shaft 26 and the sleeve 31. Substantially simultaneously, the straight side of the other camming projection engages the adjacent side of the other slot formed in the sleeve 31. Thus, it will be seen that the longitudinal or axial movement of the shaft 26 is limited and is positively arrested without frictional engagement between any of the moving parts of the driving mechanism and the supporting structure. After the direct drive connection between the shaft 26 and the sleeve 31 is established, continued rotation of the shaft 26 is transmitted through the above described speed increasing gear train to the shaft 22, thus causing the teeth of the rotor elements 19 and 20 to be moved relative to the pole faces of the field structure 18. During this continued rotation of the rotor elements 19 and 20 and each time two of the teeth of the element 20 are moved into registration with the pole faces 58b of the field member 59, an obvious low reluctance path including the leg 52b of the field member 52 is established. At this instant and as explained above, the teeth of the rotor element 19 are out of registration with the pole faces 58a of the field member 59 and the oppositely disposed pole faces of the leg 52a. Hence, the reluctance of the magnetic circuit, including the leg 52a and the permanent magnet bar 53, is relatively high as compared to the reluctance of the flux path including the leg 52b. Accordingly, a predominant portion of the flux developed by the permanent magnet bar 53 is directed through the leg 52b of the field member 52. It will, of course, be appreciated that the flux traversing the leg 52b of the field member 52 gradually increases each time two teeth of the rotor element 20 are moved into registration with the pole faces 58b of the field member 59 and is gradually decreased as the two teeth are moved out of registration with these pole faces. In a similar manner, each time any pair of teeth of the rotor element 19 are moved into registration with the pole faces 58a of the field member 59, the reluctance of the magnetic circuit including the leg 52a is gradually decreased so that the flux traversing this leg of the field structure is gradually increased, whereas, when the two teeth are moved out of registration with the indicated pole faces 58a the flux traversing the leg 52a is caused to decrease. Since the teeth of the rotor element 19 register with the slots of the rotor element 20 it will be apparent that an increase in the flux traversing the leg 52b of the field structure is accompanied by a decrease in the flux traversing the leg 52a, and, conversely, an increase in the flux traversing the leg 52a of the field structure is accompanied by a decrease in the flux traversing the leg 52b. Due to the change in the flux linking the respective windings 16 and 17, undulating or alternating voltages are developed in these windings. By connecting the windings in series aiding relation, the sum of the voltages developed by the two windings may be impressed upon the output terminals, not shown, of the generator. This type of connection is employed when a high voltage, low current output is desired. Alternatively, the windings 16 and 17 may be connected in parallel relationship to supply a low voltage, high current demand.

When rotation of the shaft 26 is arrested and the crank 29 is released, the bias exerted by the movable spring 40 upon the disk 44 causes the shaft 26 to be returned to its axial normal position wherein the tapered ends of the projections of the collar 30 nest in the V-shaped ends of the slots provided in the sleeve 31. During such axial movement of the shaft 26, the movable spring 40 is moved out of engagement with its associated contact spring 42 and back into engagement with its associated contact spring 43. The contact springs 40, 42 and 43 may be utilized for any desired control purposes although, in the application mentioned above, it is contemplated that these springs shall be used for the purpose of connecting and disconnecting the generator to and from the conductors of an associated telephone line and for the additional purpose of operatively associating the substation apparatus of an associated substation with the telephone line when the generator is disconnected from the line.

While there has been described what is at present considered to be the preferred embodiment of the invention, it will be understood that various modifications may be made therein, and it is intended in the appended claims to cover all such modifications as fall within the true spirit and scope of the invention.

What is claimed is:

1. A magneto generator comprising a supporting structure including a pair of spaced panels each provided with an opening therein, a magnetic field structure mounted between said panels and including three magnetically linked and spaced-apart legs, the center leg of said field structure comprising a permanent magnet and being provided with pole faces, windings upon the outer legs of said field structure and positioned within said openings, said outer legs being provided with pole faces oppositely disposed with respect to the pole faces of said center leg, a shaft rotatably mounted upon said supporting structure, rotor elements carried by said shaft and including alternate magnetic and nonmagnetic sections adapted to be moved between oppositely disposed ones of said pole faces, and means including said shaft for rotating said rotor elements, thereby to direct the predominant portion of the flux developed by said permanent magnet alternately through one and then the other of the outer legs of said field structure.

2. A magneto generator comprising a supporting structure including a pair of spaced panels each provided with an opening therein, a magnetic field structure mounted between said panels and including a substantially U-shaped field member, each of the legs of said U-shaped member being provided with a pole face, windings carried by said legs and positioned within said openings, a permanent magnet bar disposed between said legs, a plate provided with pole faces at the ends thereof, the pole faces of said plate being disposed opposite the pole faces of said legs, means including said plate for mounting said permanent magnet bar upon the base of said U-shaped field member, a shaft rotatably mounted upon said supporting structure, rotor elements carried by said shaft and including alternate magnetic and nonmagnetic sections adapted to be moved between oppositely disposed ones of said pole faces, and means including said shaft for rotating said rotor elements, thereby to direct the predominant portion of the flux developed by said permanent magnet bar alternately through one and then the other of the legs of said U-shaped field member.

3. A magneto generator comprising a supporting structure including a pair of spaced panels each provided with an opening therein, a magnetic field structure mounted between said panels and including a substantially U-shaped field member, each of the legs of said U-shaped member being slotted at its end to provide two separated pole faces, a winding upon each of said legs, a permanent magnet bar disposed between said legs, a plate provided with two pole faces at each end thereof, the pole faces of said plate being respectively disposed opposite the pole faces of said legs, means including said plate for mounting said permanent magnet bar upon the base of said U-shaped field member, a shaft rotatably mounted upon said supporting structure, rotor elements carried by said shaft and including alternate magnetic and nonmagnetic sections adapted to be moved between oppositely disposed ones of said pole faces, and means including said shaft for rotating said rotor elements, thereby to direct the predominant portion of the flux developed by said permanent magnet bar alternately through one and then the other of the legs of said U-shaped field member.

4. A magneto generator comprising a field structure including three magnetically linked and spaced-apart legs, the center leg of said structure comprising a permanent magnet and being provided with pole faces, a winding upon each of the outer legs of said structure, said outer legs being provided with pole faces oppositely disposed with respect to the pole faces of said center leg, rotor elements including alternate magnetic and nonmagnetic sections adapted to be moved between oppositely disposed ones of said pole faces, and means for rotating said rotor elements, thereby to direct the predominant portion of the flux developed by said permanent magnet alternately through one and then the other of the outer legs of said field structure.

5. A magneto generator comprising a field structure including a substantially U-shaped field member, each of the legs of said U-shaped member being provided with a pole face, a winding upon each of said legs, a permanent magnet bar disposed between said legs, a plate provided with pole faces at the ends thereof, the pole faces of said plate being disposed opposite the pole faces of said legs, means including said plate for mounting said permanent magnet bar upon the base of said U-shaped field member, rotor elements including alternate magnetic and nonmagnetic sections adapted to be moved between oppositely disposed ones of said pole faces, and means for rotating said elements, thereby to direct the predominant portion of the flux developed by said permanent magnet bar alternately through one and then the other of the legs of said U-shaped field member.

6. A magneto generator comprising a field structure including a substantially U-shaped field member, each of the legs of said U-shaped member being slotted at its end to provide two separated pole faces, a winding upon each of said legs, a permanent magnet bar disposed between said legs, a plate provided with two pole faces at each end thereof, the pole faces of said plate being respectively disposed opposite the pole faces of said legs, means including said plate for mounting said permanent magnet bar upon the base of said U-shaped field member, rotor elements including alternate magnetic and nonmagnetic sections adapted to be moved between oppositely disposed ones of said pole faces, and means for rotating said elements, thereby to direct the predominant portion of the flux developed by said permanent magnet bar alternately through one and then the other of the legs of said U-shaped field member.

7. A magneto generator comprising a field structure including a substantially U-shaped field member, each of the legs of said U-shaped member being provided with a pole face, a winding upon each of said legs, a permanent magnet bar disposed between said legs and provided with slots along opposite sides thereof, a plate provided with pole faces at the ends thereof, the pole faces of said plate being disposed opposite the pole faces of said legs, means including said plate and assembly bolts extending through the base of said U-shaped member and disposed in said slots for mounting said permanent magnet bar upon the base of said U-shaped member, rotor elements including alternate magnetic and nonmagnetic sections adapted to be moved between oppositely disposed ones of said pole faces, and means for rotating said rotor elements, thereby to direct the predominant portion of the flux developed by said permanent magnet bar alternately through one and then the other of the legs of said U-shaped field member.

8. A magneto generator comprising a supporting structure including a pair of spaced panels, one of said panels being provided with an opening therein, a magnetic field structure mounted upon said supporting structure between said panels and including a leg disposed closely adjacent one of said panels and provided with a pole face, a winding surrounding said leg and positioned within said opening, said field structure also including a second leg comprising a permanent magnet and provided with a pole face oppositely disposed with respect to said first-named pole face, a shaft rotatably mounted upon said supporting structure, and means including a rotor element carried by said shaft and arranged to rotate between said pole faces for varying the flux traversing said field structure and linking said winding, thereby to develop an undulating voltage in said winding.

ALBERT E. WOODRUFF.